Jan. 11, 1966   P. P. SOROKIN ETAL   3,229,221
OPTICAL MASERS HAVING TERMINAL LEVEL ABOVE GROUND STATE
Filed Dec. 12, 1960   3 Sheets-Sheet 1
FIG. 1
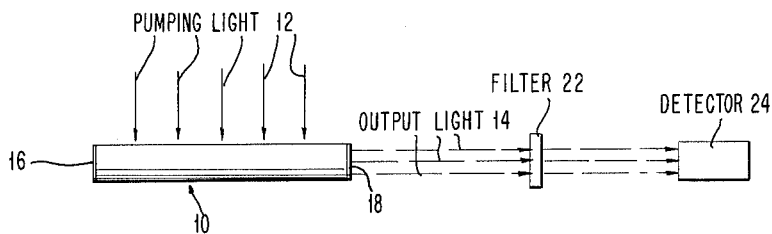
FIG. 2
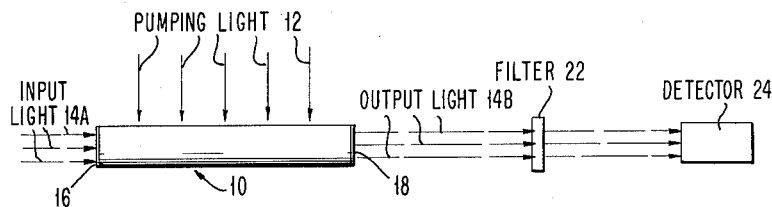
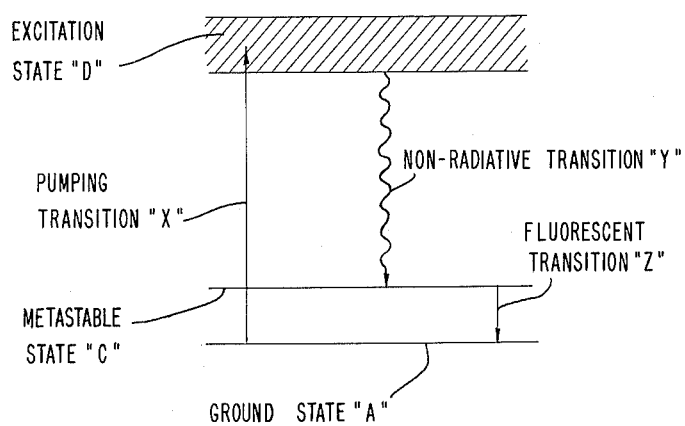
FIG. 3
INVENTORS
PETER P. SOROKIN
MIREK J. STEVENSON
BY John E. Daugherty Jr.
ATTORNEY

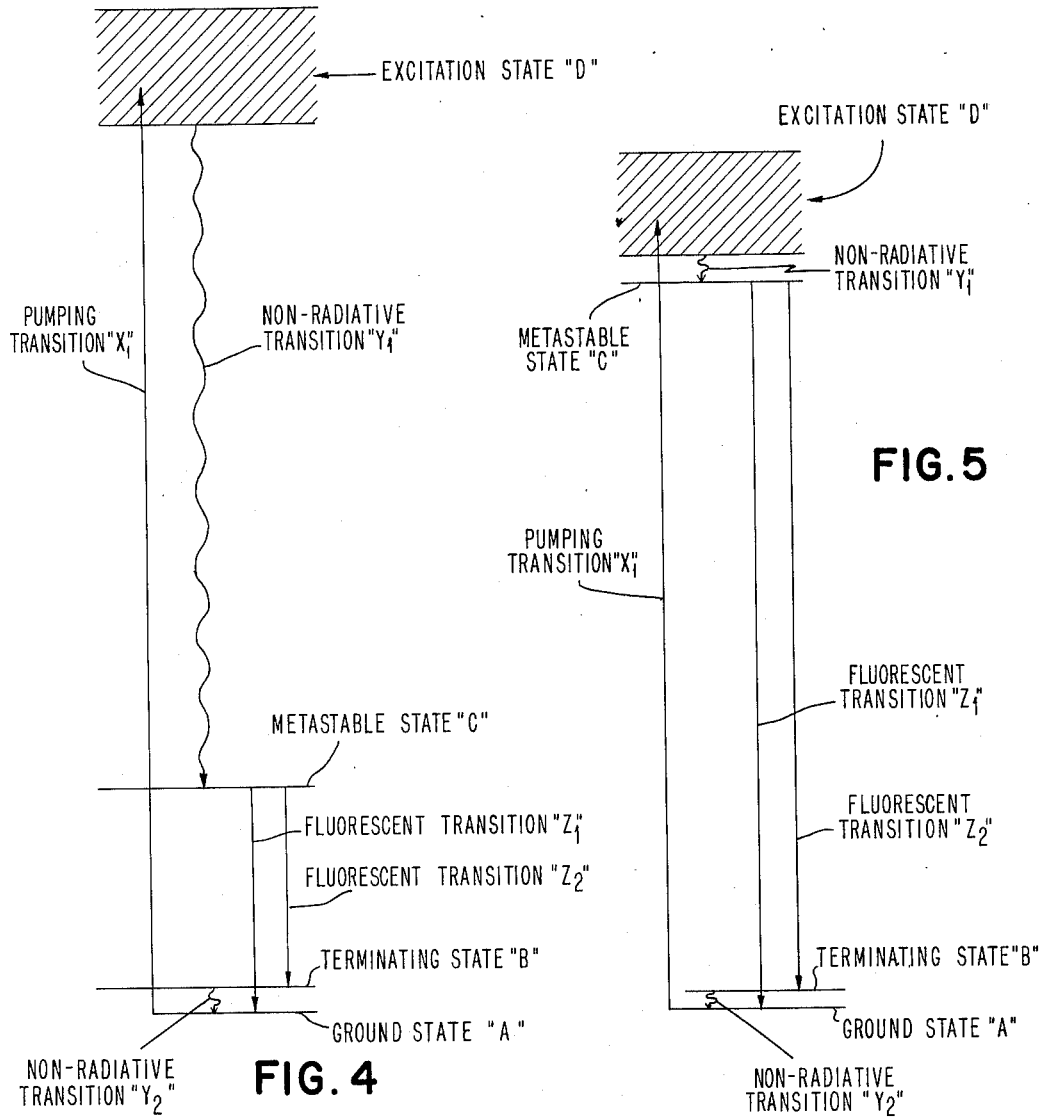
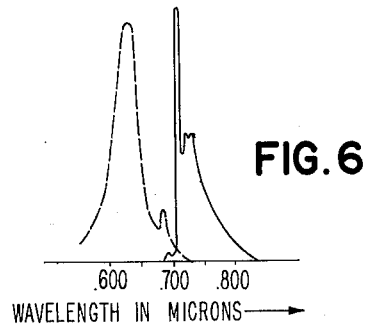
FIG. 6

United States Patent Office 3,229,221
Patented Jan. 11, 1966

3,229,221
OPTICAL MASERS HAVING TERMINAL LEVEL
ABOVE GROUND STATE
Peter P. Sorokin, Chappaqua, and Mirek J. Stevenson,
Briarcliff Manor, N.Y., assignors to International
Business Machines Corporation, New York, N.Y., a
corporation of New York
Filed Dec. 12, 1960, Ser. No. 75,296
12 Claims. (Cl. 331—94.5)

The present invention relates to masers and, more particularly, to optical masers.

The term optical maser is used to describe devices which, by stimulated fluorescent emission produce radiation in the infrared, visible and ultraviolet portions of the electromagnetic wave spectrum. Devices of this type are capable of producing radiation which is highly directional, monochromatic and coherent. In recent years, a large amount of research and development work has been expended in attempting to develop devices of this type, as is evidenced by the patent and publications cited below:

U.S. Patent No. 2,929,922, issued March 22, 1960, to Schawlow et al.; Schawlow and Townes, Physical Review, vol. 112, page 1940, December 1958; T. H. Maiman, Nature, vol. 187, page 493, August 1960; T. H. Maiman, British Communications and Electronics, vol. 7, page 674 (1960); R. J. Collins et al., Physical Review Letters, vol. 5, page 303, October 1960.

The last three of the articles listed above relate to ruby optical masers, that is masers fabricated of aluminum oxide doped with chromium. These masers exhibit strong absorption bands in the visible portion of the spectrum, particularly in the blue and green, and produce an output having a wavelength of about 6940 angstroms which is in the red. In copending application, Serial No. 73,878, now U.S. Patent 3,130,254, filed on December 5, 1960, in behalf of the inventors of the subject invention and assigned to the same assignee, optical masers are shown and described which produce outputs by stimulated emission of fluorescent transitions between two energy states above the ground state for the maser material. These masers are operable with a relatively small amount of input power and are capable of continuous wave operation.

In accordance with the principles of the present invention, improved optical masers are provided which also produce outputs by stimulated emission of fluorescent transitions between two energy states above the ground state, which require relatively little pumping power, and which are capable of continuous wave operation. Further, the energy states exhibited by the optical masers of the present invention are such that only a small amount of the energy absorbed by the ions pumped from the ground state to the excited state is dissipated in subsequent nonradiative transitions. Therefore, not only is the maser operation achieved without appreciably heating the crystal but also the operation is extremely efficient since most of the energy absorbed by the ions during the pumping is transformed by the fluorescent transitions into the desired light output of the device. As embodiments of optical masers of the present invention, there are herein disclosed optical masers which depend for their operation upon the properties of divalent samarium. More specifically, an embodiment of an optical maser is disclosed which is fabricated of a crystal of calcium fluoride doped with a small amount of samarium. This maser exhibits a strong absorption band in the visible portion of the spectrum, particularly in the red, and produces an output which is also visible and in the red portion of the spectrum. This output is provided with a relatively small amount of input pumping power. Only a small amount of the input pumping energy is used up in heat producing nonradiative transitions, and the device is capable of producing a continuous wave output.

Therefore, it is an object of the present invention to provide improved stimulated emission type devices, more particularly, devices of the type which are termed optical masers.

Another object is to provide more efficient optical masers.

A further object is to provide an improved optical maser of the type wherein maser operation is achieved without appreciably heating the maser material.

Another object is to provide an improved optical maser operable to produce output radiation by stimulated emission of ions from a metastable state into which ions relax by nonradiative transitions, wherein these nonradiative transitions are accompanied by only small energy changes and are extremely rapid.

A more specific object is to provide an improved optical maser wherein most of the energy absorbed by the ions during pumping is transformed into the desired light output for the device.

Another object is to provide an improved optical maser capable of producing an output in the visible portion of the spectrum.

Still another object is to provide optical masers having strong absorption and fluorescence in the same portion of the spectrum, thereby enabling operation with input and output light in the same frequency range.

Still another object is to provide an optical maser requiring only a relatively low amount of input energy to produce stimulated emission, and oscillation in a maser cavity.

Still another object is to provide improved optical masers which produce outputs in the form of monochromatic coherent light by stimulated transitions of ions between two energy states in the crystalline material, both of which states are above the ground state for the ions in the material.

Still another object is to provide improved optical masers employing crystals doped with divalent samarium.

A further object is to provide improved optical masers of the above described type wherein the host crystal is cubic.

The foregoing and other objects, features and advantages of the invention will be apparent from the following more particular description of preferred embodiments of the invention, as illustrated in the accompanying drawings.

In the drawings:

FIG. 1 is a schematic diagram of an optical maser used as a generator.

FIG. 2 is a schematic diagram of an optical maser used as an amplifier.

FIG. 3 is an energy level diagram indicating the transitions which occur to produce optical maser operation in a material wherein the stimulated emission transition terminates in the ground or lowest energy state for the ion in the material.

FIG. 4 is an energy level diagram depicting the energy level characteristics of an embodiment of a maser disclosed in the above cited copending application Serial No. 73,878.

FIG. 5 is an energy level diagram depicting the characteristics of an embodiment of a maser material fabricated in accordance with the principles of the present invention.

FIG. 6 shows a certain portion of the absorption and the fluorescent spectrum of the material whose energy level characteristics are depicted in FIG. 5.

Figure 7:
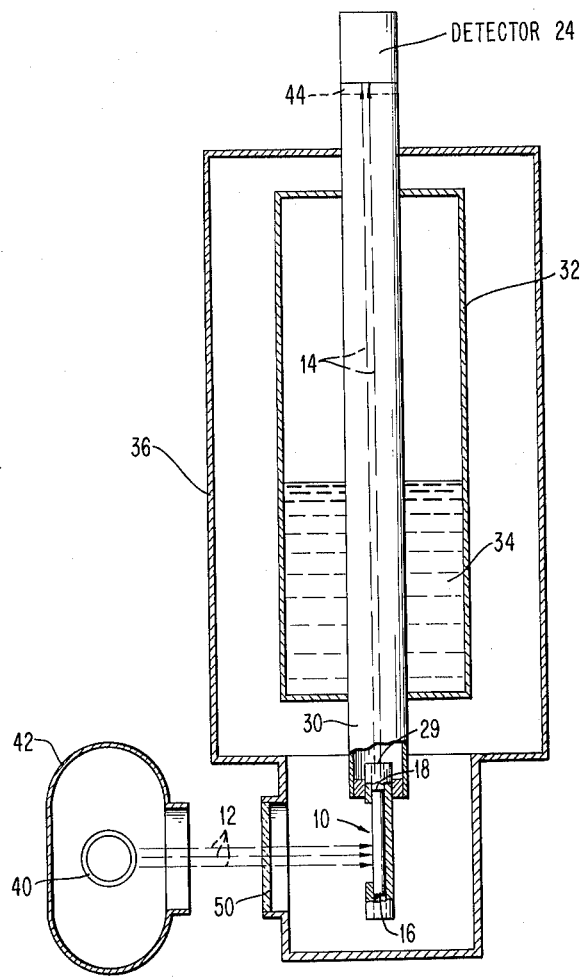
FIG. 7 is a somewhat schematic representation of one embodiment of the subject invention wherein a calcium fluoride crystals doped with divalent samarium is maintained at a temperature close to liquid helium temperature and operated to produce a monochromatic coherent visible light output.

Now referring to the drawings in detail, FIGS. 1 and 2 show optical maser devices used in application shown in the prior art. The energy level diagram of FIG. 3 is representative of the internal operation of prior art maser devices, such as ruby masers. These figures are included and a detailed description of their operation is given both to illustrate applications in which optical masers have been used, and to provide a basis for a clearer understanding of the basic principles of optical maser operation in general, and of the invention to which this application is directed.

FIG. 1 shows an embodiment of an optical maser used as a generator of electromagnetic waves. In this figure, 10 generally designates the optical maser cavity to which input pumping light, represented by the arrows 12, is applied to produce an output, represented by the arrows 14, which is both coherent and monochromatic. The cavity 10 is cylindrical in shape and is provided at opposite ends with reflective surfaces 16 and 18. Each of these surfaces is made to reflect some 98½% of the light incident thereon, and to transmit approximately 1.5% of the incident light. Where the device is to be used solely as a generator, reflecting surface 16 may be completely opaque.

The cavity 10 may be formed of a crystal such as ruby, as taught by the prior art, or of a material of the type to which the present invention is directed. Also it has been proposed to construct maser cavities using a tubular container containing a vapor having the characteristics required to produce the optical maser effect.

The manner in which optical maser devices operate may be best understood by considering FIG. 3, which is a diagram illustrating the energy states within the maser material, as well as the various transitions which occur to produce the optical maser action. In this figure, three different energy states for the ions present in maser material are shown, specifically, a ground state A, a metastable state C and an excitation state D, which is really a broad band of energy levels into which ions can be relatively easily pumped from the ground state. When the maser material is in the quiescent state, that is, in the absence of pumping, essentially all of the ions in the material are in the ground state A. When the pumping input, represented by arrows 12 in FIG. 1, is applied, certain of these ions undergo a pumping transition illustrated by the arrow X to the excitation band D. In order for this transition to occur, the pumping light applied as an input must include light at the frequency necessary to pump ions from ground state A to the excitation band D. This frequency is determined by the absorption characteristics of the maser material and it is preferable if this frequency is in the visible portion of the spectrum. During this pumping operation from ground state A to the excitation state or band D, energy is absorbed in the maser material. The ions, once they are pumped into the excitation band D, undergo a nonradiative transition represented by arrow Y to a metastable state C. By nonradiative, it is meant that during this transition, no fluorescence is produced, but rather, the energy associated with the transition is dissipated in lattice vibrations within the crystalline material. The ions in the metastable state C, after this nonradiative transition, then go through a fluorescent transition, represented by the arrow Z, back to the ground state A. During this transition, a light output is produced at a frequency determined by the fluorescent characteristics of the maser material. For example, the energy level diagram of FIG. 3 in which the fluorescent transition terminates in the ground state A is the type of transition ultilized in ruby masers of the prior art which produce outputs at a wavelength of about 6940 A.

As long as the input pumping light is maintained below a predetermined threshold, the number of ions pumped to excitation state D, which then undergo a nonradiative transition Y back to state C and finally a fluorescent transition Z back to the ground state, is too small to produce stimulated emission in the crystal and oscillation in the cavity. The output produced by the material under these conditions is referred to as spontaneous emission.

When, however, the pumping light input is increased to an intensity above a predetermined threshold, sufficient ions are moved from the ground state A through excitation state D and to metastable state C, and undergo fluorescent transitions between this state and the ground state A to produce stimulated emission of further ions between these two states. When this stimulated emission is sufficient to overcome losses in the cavity, oscillations between surfaces 16 and 18 build up to produce a high intensity monochromatic coherent light output as represented by the arrows 14 in FIG. 1. This phenomenon necessary for the optical maser effect, which is referred to as stimulated emission, is achieved when a sufficient population inversion is achieved between the low energy ground state A and higher energy metastable state C. When the pumping input produces a sufficient amount of this stimulated emission, light at the characteristic wavelength propagating in a mode between surfaces 16 and 18 actually picks up energy as it propagates. When this occurs, oscillations in this mode occur to build up high intensity, monochromatic, coherent light in the cavity.

The minimum requirement for producing this oscillation is, as stated above, that there be a population inversion between the states A and C, sufficient to overcome losses in the cavity. The maser material in its quiescent state has practically all of its ions in its low energy or ground state A. In order to achieve a population inversion, that is a condition where there are more ions in the higher energy state C than in the lower energy ground state A, it is necessary that the population of the ground state A be depleted and the population of the metastable state C be increased. This is accomplished by the pumping operation, whereby the ions are pumped to the excitation state D from which they leak back in nonradiative transitions to the metastable state C. Each of these ions then undergoes a fluorescent transition from state C to state A, producing a light output at a frequency characteristic of transitions between these two states. This light energy at this frequency, once produced, is available to stimulate further transitions between the same two states C and A. These transitions may be from the ground state A to the metastable state C which is an absorption type transition or from the metastable state C to the ground state A to produce still more fluorescence. As the population of state C, relative to state A, is increased by the application of the pumping energy, the probability to also increased that the further transitions from state C to state A will be further fluorescent transitions, producing more light, rather than absorption transitions. When this population inversion reaches the point that the stimulated fluorescent radiation between states C and A have sufficient power to overcome any losses in wave propagation longitudinally between and at reflecting surfaces 16 and 18, oscillation occurs and continues in the crystalline maser.

As stated above, each of the transitions from state C to state A is at a particular frequency determined by the material itself and, therefore, the light propagating in the maser of FIG. 1, between surfaces 16 and 18, is at this particular frequency and is highly monochromatic. Further, since any light produced in any direction other than perpendicular to the surfaces 16 and 18 is allowed to pass through the side walls of the maser crystal or is absorbed thereat, the light oscillating back and forth between these surfaces is highly coherent. In the construction shown in FIG. 1, assuming that the surface 16 is completely opaque, and the surface 18 transmits 1.5% of the incident light, this smalll portion of the oscillating light in the cavity passes through surface 18 to produce a highly monochromatic coherent light output represented by the arrows 14. This output is applied to a filter 22, which filters all light except that at the desired frequency, and is then applied to a detector 24.

The device of FIG. 1 is a generator of electromagnetic waves since its function is to produce monochromatic coherent light at a predetermined frequency in response to the energy applied in the form of a light input represented by the arrows 12. The device of FIG. 2 is similar in construction to that of FIG. 1, but is more aptly termed an amplifier since its function is to amplify the intensity of a light input represented by arrows designated 14A during propagation in the cavity 10 and to produce the amplified output at the right hand side of the cavity as represented by the arrows 14B. For this type of operation it is necessary that both of the surfaces 16 and 18 transmit at least a portion of the light incident thereon. When operated in this mode, the pump energy, represented by the arrows 12, has an intensity below the threshold intensity so that, of and by itself, it is not sufficient to produce oscillation in the cavity. As a result, in the absence of light applied at the left hand side of the structure as represented by arrows 14A, only a low intensity output, produced primarily by spontaneous emission, is available at the right hand side of the structure. As explained above, in order to produce stimulated emission from the metastable state C to the ground state A, it is necessary that light waves having a predetermined frequency be present in the cavity. This frequency is characteristic of transitions between these two states. Therefore, the input light energy, represented by the arrows 14A, is of this characteristic frequency. The added energy applied to the device by this light input is sufficient to begin the process of stimulated emission, and thereby amplify the incoming signal. There is then available at the surface 18 an output of high intensity, monochromatic, coherent light 14B, which is an amplified version of the input represented by arrows 14A. This amplified output is passed through the filter 22 to a detector 24.

It should be apparent that the devices of FIGS. 1 and 2 may be combined with the output of light generator of FIG. 1, represented by arrows 14, applied as an input to the amplifying device of FIG. 2. Further, as is known in the prior art, represented by the above cited Patent 2,929,-922, the output structure may be designed to include in place of the filter 22, a pair of double convex lenses separated by an absorptive sheet having an aperture lying in the focal plane of the lens nearest the cavity. In this way, only the energy at the desired output frequency is passed through the aperture of the second lens which reconverts the energy at the desired frequency to a plane wave which may be radiated as an input to a detector, or as an input to an amplifier such as is shown in FIG. 2.

FIG. 4 is an energy level diagram which represents certain of the characteristics of an optical maser, specifically calcium fluoride doped with trivalent uranium, shown and described in the above cited copending application, Serial No. 73,878. This diagram shows four energy states, a ground state A, a terminating state B, a metastable state C and an excitation state D. Maser operation is achieved in a device having the energy level characteristics represented in FIG. 4 by applying input light energy to pump ions from the ground state A to the excitation state D. Excitation state D is in reality a wide band strong absorption and pumping transitions from the ground state to the excitation state are characterized by a range of frequencies centered at .56 microns, that is in green, making pumping with visible light possible. During the pumping of ions from ground state A to excitation state D, energy is absorbed by the maser material. These ions then undergo a nonradiative transition represented by the arrow $Y_1$ to the metastable state C. From this point, spontaneous emission takes place as the ions undergo a transition from state C to the terminating state B, represented by arrow $Z_2$, and also from state C to the ground state A, represented by arrow $Z_1$. In the operation of the maser to produce the desired monochromatic coherent light output, the fluorescent transition from metastable state C to the terminating state B is employed and, it is in this transition that stimulated emission is built up to produce the desired oscillation in the cavity. This transition has a charatceristic wavelength of about 2.5 microns and the output of the optical maser of FIG. 4 is in the infrared.

The basic difference between the characteristics of the maser material of FIG. 4 and that of FIG. 3 is that the stimulated emission is produced between states C and B, rather than between state C and ground state A to produce the desired maser operation. As was pointed out above, when the maser is in a quiescent state, that is in the absence of input pumping energy, the population of the various states is such that almost all of the ions in the material are in the ground state A. Further, in order to produce the desired stimulated emission and resulting oscillation to realize a high intensity coherent output, it is necessary to supply sufficient energy to achieve a population inversion between the two states which produce the fluorescent transitions at the output frequency. Where these transitions are produced from a metastable state C to a ground state A, as shown in FIG. 3, it is necessary that a very large number, that is more than half, of the ions initially present in the ground state be pumped into the excitation state and then relax back to the metastable state C before such an inversion can be achieved. Succinctly stated, for population inversion, it is necessary that there be a larger number of ions in the higher energy metastable state than in the lower energy state to which the transition is to occur to produce the desired emission. Where this transition is from the metastable state directly to the ground state, which is highly populated, it is obvious that an extremely large number of ions must be pumped from the ground state A to the excitation state D. However, with a material having the energy level characteristics depicted in FIG. 4, where the fluorescent transition utilized to produce the output is from the metastable state C to the terminating state B above the ground state, much less pumping energy is required to exceed the threshold for the material and produce the desired oscillation. This is so because in the quiescent condition, that is in the absence of pumping energy, the terminating state B is essentially depopulated and, therefore, only a relatively small number of ions need be pumped to the excitation state and leak back to the metastable state C in order to achieve a population inversion between states C and B.

As was stated above with reference to FIG. 4, the ions, once they reach the metastable state C, may undergo spontaneous emissions both to the ground state A and terminating state B. However, as the input pumping energy is increased, a condition is rapidly reached wherein there is a sufficient population inversion between the higher energy state C and lower energy state B to produce stimulated emission between these states. This stimulated emission rapidly increases the energy of the light propagated along the cavity, as depicted in FIGS. 1 and 2, and oscillations at the characteristic wavelength for this transition from state C to state B, 2.5 microns, build up in the cavity. This population inversion between states C and B is attained with a much smaller pumping energy than would be required to produce a sufficient population inversion for stimulated emission between states C and A, and being reached first as the pumping energy is built up, the transition from state C to state B is favored and causes continued stimulated emission between these states resulting in oscillation so that there are only a small number of ions which undergo the less favored transition from state C to state A.

As was pointed out above, oscillation in the cavity formed by the maser material, whose characteristics are depicted in FIGS. 4 and 5, is realized for a relatively small energy input pumping signal because of the very low population of the terminating state B, thereby requiring the pumping of only a relatively small number of ions to achieve a population inversion between state C and state B. This effect is enhanced by cooling the material to very low temperature, preferably below liquid nitrogen temperature. By this cooling, the population of ions in the terminating state B is further depleted and almost all of the ions are in the ground state A. When cooled in this manner, only a very small amount of input pumping energy is required to achieve a population inversion between the metastable state C and the terminating state B necessary for the desired stimulated emission resulting in the cavity.

The energy level diagram of FIG. 4 includes one further nonradiative transition not present in that of FIG. 3 and that is the transition designated $Y_2$ from the terminating state B to the ground state A. This transition occurs for those ions which have undergone a fluorescent transition from state C to state B, and the rate at which these nonradiative transitions take place is greater than the rate of fluorescent transitions from metastable state C to terminating state B. This is important for continuous wave type operation since, if the decay from state B to ground state A is slow, the population of state B is rapidly built up, thereby making it necessary, if population inversion between states B and C is to be maintained, to apply much more pumping energy. Further, even in the presence of increased pumping energy, if the decay rate from state B to state A is slow, the population at state B would build up, thereby making continuous operation of the device impossible.

FIGS. 5 and 6 represent the characteristics of an embodiment of an optical maser constructed in accordance with the principles of the present invention. FIG. 5 is an energy level diagram representing certain of the energy states of the ions in the maser material, and FIG. 6 is a partial representation of the spectrum of the material. The energy level diagram of FIG. 5 is similar to that of FIG. 4, exhibiting four energy states between which transitions occur during the maser operation. For this reason, the same characters A, B, C and D are used in FIG. 5 to designate the ground state, terminating state, metastable state and excitation state. Similarly, the same characters $X_1$, $Y_1$ and $Y_2$, and $Z_1$ and $Z_2$ are used to designate the pumping transition, the two nonradiative transitions, and the two fluorescent transitions. In operating the optical maser whose characteristics are represented in FIG. 5, input light is applied to produce pumping transitions $X_1$ of ions from the ground state A to excitation band D; these ions undergo a nonradiative transition $Y_1$ to metastable state C and then a favored fluorescent transition $Z_2$ from metastable state C to terminating state B. When the threshold intensity for the pump input is exceeded, there is sufficient stimulated emission from ions making transitions from metastable state C to terminating state B to cause the optical cavity, as represented, for example, at 10 in FIG. 1, to generate a coherent light output. After the fluorescent transition to terminating state B, the ions undergo a nonradiative transition to ground state A at a fast rate thereby enabling population inversion between states C and B to be maintained and making continuous wave operation possible. There is also a second fluorescent transition $Z_1$ from metastable state C to ground state A but this transition is weaker than that to the terminating state B and, as the input pumping energy is increased, it is the ionic transitions to the terminating state B which are stimulated to produce the maser output.

Since the optical maser whose energy level diagram is depicted in FIG. 5 produces a coherent light output by stimulated emission of transitions to a terminating state above the ground state, it is operable with a relatively low amount of input pumping power and is capable of continuous wave operation. Aside from these and the other attributes mentioned above that are common to the maser of FIG. 5, which is an embodiment of the subject invention, and the maser of FIG. 4, which is a maser shown and described in the above cited copending application Serial No. 73,878, the maser of FIG. 5 exhibits a number of advantageous characteristics which have not been heretofore achieved.

First, the embodiment of the present invention represented in FIG. 5 is operable to produce a coherent, monochromatic, highly directional output in the visible portion of the spectrum, and this is achieved by stimulated emission to a terminating state above the ground state so that relatively low pumping power is required and a continuous wave light output is realizable. Specifically, the output of the embodiment of FIG. 5 is at about .7082 micron, which is in the red portion of the spectrum. Further, though the maser includes a number of absorption bands, the band represented as the excitation state D in FIG. 5 is a particularly strong absorption centered at about .6320 micron which is also in the visible and red portion of the spectrum. Thus, both the input pumping light and the output coherent light of the maser of FIG. 5 may be in the red portion of the spectrum.

FIG. 6 illustrates certain absorption and fluorescent characteristics for the maser material of FIG. 5. The full line wave in this figure represents fluorescence and the dotted curve absorption. This latter curve illustrates the above mentioned strong absorption centered at 0.6320 micron as well as a further absorption peak nearer to .7000 micron. The maser also exhibits other absorption bands not shown in the figures. The fluorescent transition at 0.7082 mentioned above is shown as a strong narrow fluorescent line. There is also a small fluorescent peak at just below .7000 micron which corresponds in wavelength to smaller absorption peak mentioned above. These peaks at this wavelength represent absorptive and emissive transitions between metastable state C and ground state A. The other fluorescent peaks just to the right of the strong fluorescent line at .7082 micron are produced by transitions involving energy levels not shown in FIG. 5. There are only a small number of these competing transitions and they are substantially weaker than the transition at .7082 micron so that there is very little energy drain away from the desired transition which produces the output to be used.

A further and extremely important feature of optical masers in accordance with the principles of the subject invention is that very little of the energy absorbed by the ions pumped into the excitation state D is given up in nonradiative transitions; rather, about 80% or more of the energy absorbed by these ions is given up in the fluorescence accompanying the transition from state C to state B. This is advantageous not only from an efficiency standpoint but from the standpoint of temperature stability of the device. During nonradiative transitions, as represented at $Y_1$ and $Y_2$, the ions, as they decay from the high energy state to the low energy state, dissipate energy which is taken up in the crystalline lattice of the maser crystal, thereby heating the crystal. The energy of ions in the metastable state C for the maser material of FIG. 5 is only slightly lower than the energy state of ions in the excitation state D so that very little heating is produced by the transitions $Y_1$ to the metastable state and the ions give up practically all of their pump energy in the fluorescent transitions to terminating state B to produce the useful output of the maser. A further important feature of the energy level structure of FIG. 5 is an extremely rapid decay rate from excitation state D to the metastable state C. This is primarily due to the small energy difference between the bottom of the excitation state D and the metastable state C which permits the nonradiative transitions to be made by a relatively small number of interactions with the crystal lattice.

Optical masers having energy characteristics such as are shown in FIG. 5, have been fabricated by using crystals doped with divalent samarium. The divalent samarium ion provides the strong absorption band in the visible spectrum, the strong fluorescent transitions from a metastable state to a terminating state above the ground state, and the operation whereby almost all of the pump energy absorbed by the ions is given up in fluorescent transitions and with very little consequent heating of the crystal. Further, the divalent samarium ion provides an energy level structure such that the nonradiative transitions from the excitation state D to the metastable state C are extremely rapid. More specifically, the optical maser whose characteristics are shown in FIGS. 5 and 6 is one fabricated of a crystal of calcium fluoride doped with 0.1% of divalent samarium. This crystal accepts the divalent samarium, and has good optical qualities. Other host crystals which accept the divalent samarium ion and have good optical qualities may also be used. One advantage of the alkaline earth fluorides, such as calcium and barium fluoride, as host crystals, is their cubic symmetry and isotropic index of refraction. The actual wavelengths of the absorption bands and fluorescent lines, of course, vary with the choice of the host crystal.

FIG. 7 is a somewhat diagrammatic representation of one embodiment of an optical maser device constructed in accordance with the principles of the invention and operated at an extremely low temperature. In this figure, designations corresponding to those used in FIGS. 1 and 2 are used to identify like components. Therefore, numeral 10 designates the crystal cavity having reflecting surfaces 16 and 18. The crystal is the calcium fluoride crystal doped with divalent samarium whose characteristics are presented in FIGS. 5 and 6 and was prepared in the following manner.

Selected and purified pieces of calcium fluoride are placed in a graphite crucible together with a measured amount of samarium fluoride powder. The crystal is grown in the crucible under highly reductive conditions to insure that the samarium is introduced in the divalent state. The crucible is designed to provide a crystal of calcium fluoride which is cylindrical in shape. The crystal is green in color. After the crystal is prepared in this manner, it is cut down to a diameter of about 4 millimeters and a length of about 20 millimeters. The ends of the crystal are then polished and made highly parallel across the end surfaces. The cylindrical surface is left rough ground. Finally, the ends of the crystal are silvered and then covered with a protective optical coating of silicon monoxide to prevent oxidation of the silver. One of the two ends, specifically end 16 as shown in FIG. 7, is made completely opaque and the other end is silvered in such a way that it transmits 1.5% of light incident thereon. The silicon monoxide coating has a thickness, as measured, of approximately one half wavelength at 0.7 micron.

The crystal, which forms the cavity 10 having the reflecting surfaces 16 and 18, as prepared above, is, as shown in FIG. 7, secured in a mounting 29 in the lower end of a long cylindrical tube 30. This tube is secured in a dewar vessel having an outer surface 36 and an inner container 32 which is about half filled with liquid helium 34. A vacuum is maintained in the space between the liquid helium container 32 and the outer surface 36. The crystal cavity 10 is mounted with its surface 18, which is capable of transmitting 1.5% of incident light, at the lower end of cylindrical tube 30. This tube is also evacuated. Since the tube 30 passes through the liquid helium 34 in container 32, this tube is essentially at 4.2° K., which is the boiling point for liquid helium at atmospheric pressure. The mounting for the cavity 10 in tube 30 is brass so that the crystal is at a temperature very close to liquid helium temperature.

The operation of the device is similar to the operation described with reference to FIG. 1. The pumping light input, represented by the arrows 12, is applied through a window 50 to the surface of the cylindrical cavity 10. This light is provided by a source 40, which is mounted in a light shield 42 to minimize losses. This light source is a xenon discharge lamp which is actuated under the control of a bank of condensers that are first charged and then discharged when the lamp is triggered. The output coherent light produced by the cavity 10 is, as before, represented by the arrows 14, and this light travels along the tube 30 to an output window 44 in the top of the tube and is applied through a filter for filtering out outputs at other than the desired wavelength, to a detector 24 in the form of a photomultipler.

It will, of course, be apparent to those skilled in the art that devices embodying the subject invention may be used in other applications than those illustrated in FIGS. 1 and 2. As one example, the device may be operated in such a way that one light input supplying the pumping light supplies sufficient energy to maintain the device just below its threshold and the device is triggered into oscillation by the selective application of another light source of sufficient light energy to cause the threshold to be exceeded.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical maser device for producing coherent radiation comprising; means forming a resonant structure for said radiation; a body doped with divalent samarium disposed within said resonant structure means; means for applying input radiation to said body for producing monochromatic, coherent radiation from said body by stimulated emission in said body of ionic transitions of said divalent samarium from a first energy state to a second energy state in said body, both of which states are above the ground energy state for said body; and means for emitting said coherent radiation from said resonant structure means.

2. The device of claim 1 wherein said body is a crystal which is cubic.

3. The device of claim 2 wherein said crystal is an alkaline earth fluoride crystal.

4. The device of claim 3 wherein said crystal is calcium fluoride, and said coherent radiation has a wavelength in the visible portion of the spectrum.

5. The device of claim 4 wherein said crystal is calcium fluoride and is doped with about .1% of divalent samarium.

6. In an optical maser device for continuously producing coherent radiation by continuous stimulated emission, comprising a crystal of maser material; means maintaining said crystal at a temperature below that of liquid nitrogen; resonating means including said crystal for said coherent radiation; said crystal being doped with divalent samarium exhibiting a strong absorption band, a ground energy state, and first and second other energy states both of which are above said ground energy state; said stimulated emission being produced by fluorescent ionic transitions of said divalent samarium from said first energy state to said second energy state; means for populating said first energy state by applying energy to pump divalent samarium ions from said ground state to said absorption band which ions then undergo a nonradiative transition to said first state; the energy of said nonradiative transitions being appreciably less than the energy of said fluorescent transitions whereby the majority of the energy absorbed by divalent samarium ions during pumping to said absorption band is given up in the form of light during said fluorescent transition from said first to said second energy state and means for extracting said coherent radiation from said resonating means.

7. An optical maser device for producing coherent radiation by stimulated emission comprising a body of material capable of exhibiting a negative temperature; resonating means including said body for said coherent radiation; said body exhibiting a strong absorption band, a ground energy state, and first and second other energy states both of which are above said ground energy state; said stimulated emission being produced by fluorescent ionic transitions from said first energy state to said second energy state; means for populating said first energy state by applying energy to pump ions from said ground state to said absorption band which ions then undergo a nonradiative transition to said first state; the energy of said nonradiative transitions being appreciably less than the energy of said fluorescent transitions whereby the majority of the energy absorbed by said ions during pumping to said absorption band is given up in the form of light during said fluorescent transitions from said first to said second energy state and means for extracting said coherent radiation from said resonating means.

8. An optical maser device for producing coherent radiation by stimulated emission comprising a body of material capable of exhibiting a negative temperature; resonating means including said body for said coherent radiation; said body exhibiting a strong absorption band, a ground energy state, and first and second other energy states both of which are above said ground energy state; said stimulated emission being produced by fluorescent ionic transitions from said first energy state to said second energy state; means for populating said first energy state by applying energy having a given wavelength in a particular portion of the electromagnetic wave spectrum to pump ions from said ground state to said absorption band which ions then undergo a nonradiative transition to said first state; the energy of said nonradiative transitions being appreciably less than the energy of said fluorescent transitions, whereby the coherent radiations produced by said fluorescent transitions are at a wavelength in substantially the same portion of the spectrum as said given wavelength.

9. The device of claim 8 wherein said maser body is doped with divalent samarium.

10. The device of claim 8 wherein said body is a crystal of calcium fluoride doped with divalent samarium and said wavelengths of the applied energy and said coherent radiation are in the red portion of the spectrum.

11. An optical maser device producing coherent radiation comprising; a crystal doped with divalent samarium whereby said doped crystal exhibits at least one strong absorption band in the visible portion of the spectrum and a fluorescent band in the same portion of the spectrum; said fluorescent band being produced by ionic transitions of the divalent samarium from a first energy state to a second energy state both of which are above the ground energy state for said divalent samarium in said crystal; means for cooling said crystal to thereby narrow said fluorescent band and decrease the population of said second energy state relative to said ground state; resonating means including said crystal for said coherent radiation; means for exciting said samarium to produce stimulated emission in said crystal by stimulating ionic transitions of said divalent samarium from said first energy state to said second energy state to provide said coherent radiation in said resonating means; and means for extracting coherent radiation from said resonating means.

12. An optical maser device for producing coherent radiation comprising:
(a) means forming an optical resonator for said coherent radiation;
(b) a negative temperature medium including divalent samarium having ions each characterized by a ground energy level and a pair of energy levels each above said ground level defining a given frequency of optical radiation;
(c) said medium being disposed within said optical resonator means;
(d) means for exciting said ions to create a population inversion producing stimulated emission of coherent radiation within said medium at said given frequency and,
(e) means for extracting said coherent radiation from said medium.

References Cited by the Examiner

UNITED STATES PATENTS 2,929,922  3/1960  Schawlow et al. _____ 88—61
3,130,254  4/1964  Sorokin et al. _____ 331—94.5

OTHER REFERENCES

Electronics "Light Amplifier Extends Spectrum" Electronics," July 22, 1960, page 43.

Kroger "Some Aspects of the Luminescence of Solids," Elsevier Publishing Co., Inc. New York, 1948, QC478K8, pages 33, 34, 211, 294 and 295 applied.

Schawlow and Townes "Infrared and Optical Masers," Physical Review, vol. 112, No. 4, December 15, 1958, pages 1940–49.

JEWELL H. PEDERSEN, *Primary Examiner.*

EMIL G. ANDERSON, *Examiner.*